United States Patent [19]

Brandenstein et al.

[11] Patent Number: 4,889,520

[45] Date of Patent: Dec. 26, 1989

[54] TENSION DEVICE FOR DRIVE BELT

[75] Inventors: Manfred Brandenstein, Eussenheim; Gerhard Herrmann, Schweinfurt; Roland Haas, Hofheim, all of Fed. Rep. of Germany

[73] Assignee: SKF GmbH, Schweinfurt, Fed. Rep. of Germany

[21] Appl. No.: 321,907

[22] Filed: Mar. 10, 1989

[30] Foreign Application Priority Data

Mar. 25, 1988 [DE] Fed. Rep. of Germany ....... 3810187

[51] Int. Cl.$^4$ ............................................. F16H 7/12
[52] U.S. Cl. .................................................. 474/135
[58] Field of Search .............. 474/101, 109, 111, 113, 474/115, 117, 133, 135, 136, 138

[56] References Cited

U.S. PATENT DOCUMENTS 4,571,222 2/1986 Brandenstein et al. ......... 474/135 X
4,824,421 4/1989 Komorowski ....................... 474/135

FOREIGN PATENT DOCUMENTS 2617368 2/1977 European Pat. Off. .

Primary Examiner—Thuy M. Bui
Attorney, Agent, or Firm—Rosen, Dainow & Jacobs

[57] ABSTRACT

Two springs inserted in series, which press a tension roller against a drive belt, are provided in a tension device for a drive belt. The tension spring essentially effects adjustment of the tension roller during assembly and after that effectively is inoperative. The working spring is active during operation and within a limited range of adjustment of the tension roller. The tensions of the two springs are designed so that during assembly equilibrium of forces exists at a middle working point within the path of adjustment. These features result in a simple and precise adjustment during assembly.

33 Claims, 1 Drawing Sheet

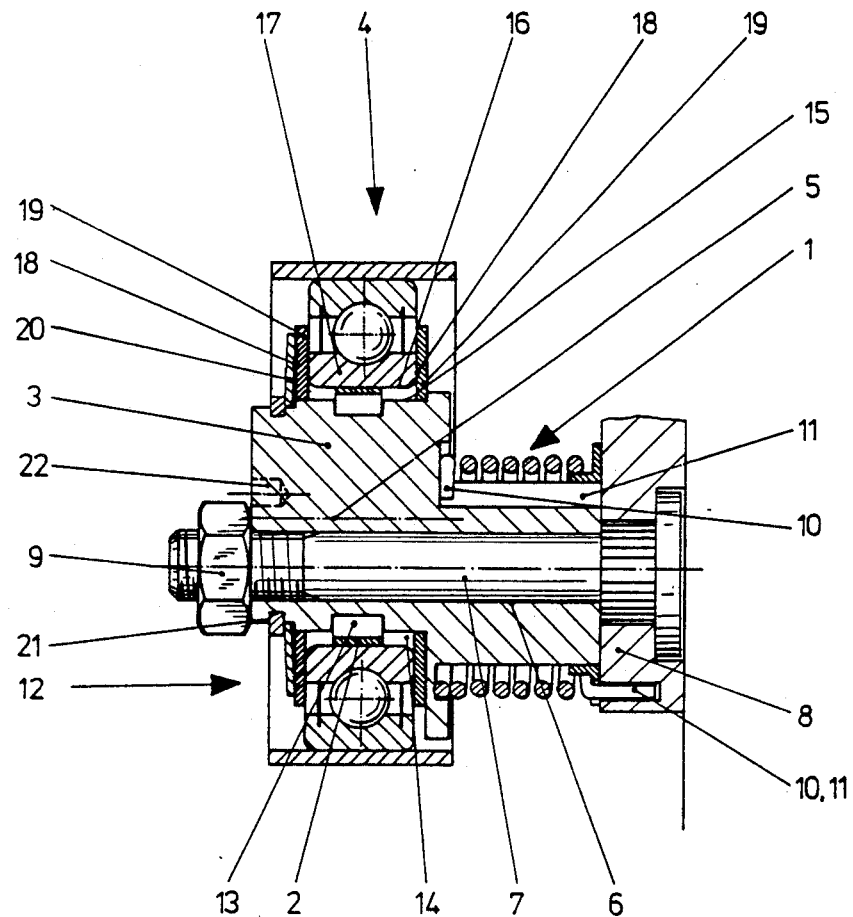

TENSION DEVICE FOR DRIVE BELT

BACKGROUND OF THE INVENTION

1. Field of the Invention

The invention concerns a tension device comprising a tension roller which is supported and free to rotate on a supportive member, a pivot bearing outside an axis of rotation of the tension roller and capable of being locked in position with respect to an engine block or the like, a tension spring pressing the tension roller, for adjustment, against the drive belt or the like, and of an additional spring pressing against the drive belt.

2. Description of the Prior Art

A tension device of the aforementioned type has already been disclosed in DE-OS No. 2,617,368. In this design a swiveling lever is pivotably supported on a supporting plate. A tension roller is arranged outside a pivot bearing and is tensioned against a drive belt by a working spring acting on the other end of the swinging arm. This working spring is constantly active during operation. To permit an optimal basic adjustment, the supporting plate is for its part connected with the engine block via another pivot bearing and may be fixed in the proper place by a fastening screw. An additional tension spring arranged between the engine block and the supporting plate permits the basic adjustment to be made with constant tension against the drive belt when the tension roller is arrested in its swivel motion with respect to the supporting plate. After release of the arrest, operating shocks and swings of the drive belt are absorbed and equalized by the working spring. Assembly of the tension device in the manner described is relatively costly and, due especially to the arrest required, complicated. It requires a complicated procedure. In addition, the known tension device has a great range of adjustment of the swiveling lever, which may result in damage having serious consequences. Strong pulse shocks in the operating behavior of the engine cause the drive belt to stretch severely in the region of the tension device. This leads to deflection of the tension roller in the direction away from the drive belt. Since the known tension device exhibits no damping of any kind in this direction of motion, the drive belt may be slack for at least a short time. In this phase the likelihood of slippage between the drive wheels and the drive belt is very great. In this case, especially in toothed belts, a failure to maintain a correct angle of rotation between, for example, crankshaft and cam shaft occurs due to skipping of one or more teeth, which may lead to shutdown of the engine, and at the least to defective operation.

SUMMARY OF THE INVENTION

The object of the invention is to provide a tension device of the type mentioned at the beginning which consists of few individual parts, one which may be simply assembled and adjusted and by which slippage between the drive belt and the drive wheels, which may result in skipping of drive belt teeth during operation, is reliably prevented.

This object is accomplished in that the tension of the working spring operative against the drive belt exceeds that of the tension spring and the adjusting motion of the tension roller is in operation limited to one region, limitation of the adjusting motion being provided in the direction toward the working spring pressure, which limitation results from the position of the tension roller at maximum engine temperature, and limitation of the adjusting motion in the direction toward the drive belt is given by the maximum increase in the section of the drive belt arranged in the region of the tension device, under the most unfavorable operating conditions.

Owing to the working spring having a force in the direction of the tension roller, other means for arresting the tension roller within its range of adjustment effective in operation may advantageously be omitted. In addition, this range of adjustment is limited to a small extent. The optimal adjustment results from considering various operating values or parameters, such as required tension, greatest corrected variation of drive-belt length as a function of engine temperature, elongation of drive belt due to aging, running in, etc., greatest elongation in the loaded side of the drive belt as a result of pulse shocks, instantaneous loads, etc., and elongation of the drive belt required to obtain skipping of a tooth due to slippage, to mention only a few influences. These values are different for virtually each application and, as a basis for computation, in cases of doubt supported by experiments, result in the required degree of to the invention.

A limitation of adjusting motion before a tooth is skipped under the most unfavorable operating conditions is sought in every case. The limit in the other direction results from the maximum required readjustment of the tension roller owing to elongation of the drive-belt section in the unloaded half. In an example adapted to practice, the limited range of adjustment of the tension roller amounted to about 2 mm.

The dissimilar spring forces of the tension spring and the working spring are selected, as characterized by additional features of the invention, so that the working spring, at about half its deflection within the adjusting motion, produces the required tension for the drive belt and this spring force matches that of the tension spring. Under these conditions, upon assembly care must only be taken to see the supporting member, with the tensioned tension spring, is locked in position by the fastening screw, to be sure that the working spring, on the one hand, is tensioned and the range of adjustment of the tension roller is optimally arranged for later operation. This may be achieved most simply by providing for the tension spring a constant spring force over the required range. This can be done by, for example, a spiral or helical spring torsionally loaded. The working spring, on the other hand, should have a progressive tension characteristic, wherein at a working point within the range of adjustment of the tension roller in operation equilibrium of forces prevails between the two springs. Starting from this, the spring force of the working spring rises increasingly in the direction of motion away from the drive belt and decreases in the direction of motion toward the drive belt. In this way, correct adjustment and location of the working point and/or range of adjustment is effected automatically in assembly. The location of the working point within the range of adjustment may of course be varied as desired by selection of the spring forces.

The tension device pursuant to the invention is distinguished by few individual parts and particularly simple handling in assembly. In addition, advantageously constant results are obtained in series assembly.

BRIEF DESCRIPTION OF THE DRAWING

The drawing discloses a sectional elevation view of the tension device of the subject invention by the drawing.

DESCRIPTION OF THE PREFERRED EMBODIMENT

The single figure shows a tension device for a drive belt with a tension spring 1 and a working spring 2. A tension roller 4 is supported and free to rotate on a supporting member 3. The supporting member 3 has available a pivot bearing 6, arranged eccentrically to the axis of rotation 5 of the tension roller 4, which bearing is formed by a threaded pin 7 and a corresponding bore in the supporting member 3. The threaded pin 7, in a mounting plate 8, is fixed to an engine block or the like. On the other hand, the supporting member 3 may be fastened securely against twisting by a nut 9. Between the supporting member 3 and the mounting plate 8 is arranged, as tension spring 1, a spiral spring torsionally loaded, whose free ends 10 are bent at an angle and engage in recesses 11 of the supporting member 3 and/or the mounting plate 8. The tension spring 1 has a virtually constant tension over the entire range of travel. The ball bearing 12, provided for the rotary motion of the tension roller 4, is radially movable on the supporting member 3 via the working spring 2 which in this embodiment is a corrugated washer spring embedded in a groove 13. The radial range of adjustment results from the radial dimension of an annular slot 14 and is limited by the surface 15 of the supporting member 3 and the surface 16 of the bore of the inner ring 17. The radial spring characteristic of the working spring 2 is progressive, i.e., the spring force increases with increasing spring deflection. Axially, the inner ring 17 is clamped, by means of a disk spring 20 and a retaining ring 21, between annular disks 19 resting on both sides on its faces 18. In the radial spring deflection of the inner ring 17, its faces 18 slide on the annular disks 19, whereby a frictional damping is produced.

In assembly, the entire tension device is fastened by, for example, screws to the engine block via the mounting plate 8. There the drive belt, not illustrated, already rests on the tension roller 4. The nut 9 is loosened, so that the supporting member 3 can adjust to the course of the drive belt by swinging about the threaded pin 7 against the force of the tension spring 1. In this position the nut 9 is tightened. The tension roller, via the inner ring 17 and the working spring 2, is then fitted in radially by about half the annular slot 14 shown, so that in operation one half of the annular slot 14 remains for deflection when the drive belt is compressed and the other half for deflection out when the drive belt is elongated.

To replace the drive belt, the nut 9 only needs to be loosened. With an auxiliary tool, not represented, engaging in adjusting bores 22, the tension roller 4 can be swung, against the force of the tension spring 1, out of the range of travel of the drive belt.

The embodiment illustrated is only one example. Numerous variations, wherein a limitation of the range of adjustment and two springs coordinated with one another are provided, are of course possible within the idea of the invention and within the scope of the appended claims.

What is claimed is:

1. A tension device for a drive belt comprising:

a tension roller;

a supporting member on which said tension roller is supported and free to rotate;

a pivot bearing abutting said supporting member and located outside an axis of rotation of the tension roller and capable of being locked in position with respect to a structural element outside of said tension device;

a tension spring oriented so as to press the tension roller against the drive belt, said tension spring functioning to facilitate adjustment of said tension roller during assembly and said tension spring having no effect on operation of the drive belt after locking of the pivot bearing in position;

a working spring oriented so as to press the tension roller against the drive belt during operation, said working spring having a greater tension than said tension spring whereby the movement of the tension roller is limited in a direction towards said working spring and movement of the tension roller in a direction toward said drive belt is limited by a maximum length to which said drive belt can extend in the vicinity of said tension device under operating conditions.

2. A tension device according to claim 1, wherein the tension spring is a torsion spring arranged coaxially with the pivot bearing and having a constant spring force over a wide spring length range, the working spring having a progressively increasing spring force over the range of length adjustment provided, and an equilibrium of forces between the tension spring and the working spring existing at a working point lying in the middle range of adjustment.

3. A tension device according to claim 2, wherein the tension roller is radially movable on the supporting member through the working spring and comprises means for friction damping said tension roller.

4. A tension device according to claim 3 wherein said means for friction damping said tension roller comprises an inner ring abutting said tension roller, and a pair of annular disks abutting said inner ring.

5. A tension device according to claim 1, wherein the tension roller is radially movable on the supporting member through the working spring and comprises means for friction damping said tension roller.

6. A tension device according to claim 5 wherein said means for friction damping said tension roller comprises an inner ring abutting said tension roller, and a pair of annular disks abutting said inner ring.

7. A tension device according to claim 6 wherein motion of said tension roller away from said drive belt is limited by an outer surface of said supporting member and an inner surface of said inner ring.

8. A tension device according to claim 1, wherein the pivot bearing comprises a single threaded pin locking the supporting member in position 9. The tension device of claim 1 wherein said structural element outside said tension device is an engine block.

10. A tension device according to claim 1 wherein said movement of said tension roller toward said working spring is limited by its position at maximum engine temperature.

11. A tension device according to claim 10 wherein said limitation of the adjusting motion in the direction toward the drive belt is given by said maximum increase under the most unfavorable operating conditions.

12. A tension device for a drive belt comprising:

a tension roller;

a supporting member on which said tension roller is supported and free to rotate;

a tension spring oriented so as to press the tension roller against the drive belt, said tension spring functioning to facilitate adjustment of said tension roller during assembly;

means for causing said tension spring to have no effect on operation of the drive belt;

a working spring oriented so as to press the tension roller against the drive belt during operation, said working spring having a greater tension than said tension spring whereby the movement of the tension roller is limited in a direction towards said working spring and movement of the tension roller in a direction toward said drive belt is limited by a maximum length to which said drive belt can extend in the vicinity of said tension device under operating conditions.

13. The tension device according to claim 12, wherein said means for causing said tension spring to have no effect upon operation of the drive belt comprises a pivot bearing.

14. The tension device according to claim 12, wherein the tension spring is a torsion spring arranged coaxially with the pivot bearing and having a constant spring force over a wide spring length range, the working spring having a progressively increasing spring force over the range of length adjustment provided, and an equilibrium of forces between the tension spring and the working spring existing at a working point lying in a middle range of adjustment.

15. A tension device according to claim 14 wherein said means for friction damping said tension roller comprises an inner ring abutting said tension roller, and a pair of annular disks abutting said inner ring.

16. The tension device according to claim 14, wherein the tension roller is radially movable on the supporting member through the working spring and comprises means for friction damping said tension roller.

17. The tension device according to claim 14, wherein the pivot bearing comprises a single threaded pin locking the supporting member in position.

18. A tension device according to claim 12 wherein said means for friction damping said tension roller comprises an inner ring abutting said tension roller, and a pair of annular disks abutting said inner ring.

19. A tension device according to claim 18 wherein motion of said tension roller away from said drive belt is limited by an outer surface of said supporting member and an inner surface of said inner ring.

20. A tension device according to claim 12 wherein said movement of said tension roller toward said working spring is limited by its position at maximum engine temperature.

21. A tension device according to claim 20 wherein said limitation of the adjusting motion in the direction toward the drive belt is given by said maximum increase under the most unfavorable operating conditions.

22. The tension device according to claim !2, wherein the pivot bearing comprises a single threaded pin locking the supporting member in position.

23. The tension device according to claim 12, wherein the tension roller is radially movable on the supporting member through the working spring and comprises means for friction damping said tension roller.

24. A method for positioning a tension roller within a tension device for a drive belt comprising the steps of:

positioning a tension spring in a direction opposing motion of the tension roller against the drive belt, the tension spring having substantially constant tension over a desired range of motion of the tension roller;

positioning a working spring in a direction opposing motion of the tension roller against the drive belt, the working spring having a progressive tension characteristic wherein at a predetermined working point within a range of adjustment of the tension roller equilibrium of forces prevails between the two springs and causing said tension spring to have no effect on operation of the drive belt after said predetermined working point has been reached and hence a range of adjustment of said tension roller has been established.

25. The method of claim 24 wherein said step of causing said tension spring to have no effect upon said drive belt comprises locking a pivot bearing in position, said pivot bearing abutting a supporting member on which said tension roller is supported and free to rotate.

26. The method of claim 25 wherein said positioning steps are performed at maximum engine temperature.

27. The method of claim 25 wherein said positioning steps are performed under the most unfavorable operating conditions.

28. A tension device made by the method of claim 25.

29. The method of claim 24 wherein said positioning steps are performed at maximum engine temperature.

30. A tension device made by the method of claim 29.

31. The method of claim 24 wherein said positioning steps are performed under the most unfavorable operating conditions.

32. A tension device made by the method of claim 31.

33. A tension device made by the method of claim 24.

* * * * *

UNITED STATES PATENT AND TRADEMARK OFFICE
CERTIFICATE OF CORRECTION

PATENT NO. : 4,889,520

DATED : December 26, 1989

INVENTOR(S) : Manfred Brandenstein et al.

It is certified that error appears in the above-identified patent and that said Letters Patent is hereby corrected as shown below:

Column 6, line 9, change "!2" to --12--.

Signed and Sealed this

Ninth Day of February, 1993

*Attest:*

STEPHEN G. KUNIN

*Attesting Officer*  *Acting Commissioner of Patents and Trademarks*